US00RE41492E

(19) United States
(12) Reissued Patent
Mori et al.

(10) Patent Number: US RE41,492 E
(45) Date of Reissued Patent: Aug. 10, 2010

(54) TRAFFIC INFORMATION OUTPUT DEVICE/ METHOD AND TRAFFIC INFORMATION DISTRIBUTION DEVICE/METHOD

(75) Inventors: Kenji Mori, Toyota (JP); Masayuki Yurimoto, Toyota (JP)

(73) Assignee: Toyota Jidosha Kabushiki Kaisha, Toyota (JP)

(21) Appl. No.: 11/889,588

(22) Filed: Aug. 14, 2007

Related U.S. Patent Documents

Reissue of:
(64) Patent No.: 6,931,320
Issued: Aug. 16, 2005
Appl. No.: 10/307,304
Filed: Dec. 2, 2002

(30) Foreign Application Priority Data

Dec. 27, 2001 (JP) ..... 2001-397896

(51) Int. Cl.
*G01C 21/32* (2006.01)
*G08G 1/123* (2006.01)
*G01C 21/34* (2006.01)
*G06G 7/76* (2006.01)

(52) U.S. Cl. ..... 701/212; 701/117; 701/211; 701/208; 701/209; 340/995.15; 340/995.24; 340/995.12; 340/995.13

(58) Field of Classification Search ..... 701/117, 701/200, 207, 208, 211, 212, 209; 340/995.1, 340/995.14, 995.13, 995.15, 995.24
See application file for complete search history.

(56) References Cited

U.S. PATENT DOCUMENTS 5,193,214 A 3/1993 Mardus et al.
5,699,255 A * 12/1997 Ellis et al. ..... 701/212
5,862,510 A * 1/1999 Saga et al. ..... 701/211
5,864,305 A 1/1999 Rosenquist
6,546,332 B2 4/2003 Matsuo
6,952,643 B2 10/2005 Matsuoka et al.
2001/0001133 A1 * 5/2001 Hotta ..... 701/208
2002/0193939 A1 * 12/2002 Matsuo ..... 701/200
2003/0028312 A1 * 2/2003 Matsuoka et al. ..... 701/117
2003/0201914 A1 * 10/2003 Fujiwara et al. ..... 340/995.24
2008/0195300 A1 * 8/2008 Zhao et al. ..... 701/117

FOREIGN PATENT DOCUMENTS

EP 0 987 910 A2 3/2000
EP 1076325 A2 2/2001
JP A-10-300487 11/1989
JP A-H06-96391 4/1994
JP 7-57187 3/1995
JP A-H07-306867 11/1995
JP A 10-47979 2/1998
JP A-H11-134594 5/1999
JP A-2000-30187 1/2001
JP A-2001-133274 5/2001
JP A-2001-194170 7/2001

* cited by examiner

*Primary Examiner*—Thomas G. Black
*Assistant Examiner*—Christine M Behncke
(74) *Attorney, Agent, or Firm*—Oliff & Berridge, PLC

(57) ABSTRACT

A traffic information distribution system includes a distribution device for synthesizing pieces of traffic information supplied from a traffic information center, an output device for outputting pieces of traffic information distributed from the distribution device, and a data communicator that is connected to the output device and that can communicate with the distribution device in a bidirectional manner. The distribution device responds to a request signal transmitted from the output device via the data communicator, effectively synthesizes the pieces of traffic information in consideration not only of a request made by a user, recognizability at the time of output, a state of a map on a display screen and a range of the map, but also of various factors in which actual road conditions are reflected. The pieces of the traffic information that have been synthesized are distributed via the data communicator to the output device.

43 Claims, 13 Drawing Sheets

TRAFFIC INFORMATION OUTPUT DEVICE/ METHOD AND TRAFFIC INFORMATION DISTRIBUTION DEVICE/METHOD

Matter enclosed in heavy brackets [ ] appears in the original patent but forms no part of this reissue specification; matter printed in italics indicates the additions made by reissue.

INCORPORATION BY REFERENCE

The disclosure of Japanese Patent Application No. 2001-397896 filed on Dec. 27, 2001, including the specification, drawings, and abstract is incorporated herein by reference in its entirety.

BACKGROUND OF THE INVENTION

1. Field of Invention

The invention relates to a traffic information output device for supplying a user with pieces of traffic information and a traffic information distribution device/method for distributing pieces of traffic information. More specifically, the invention relates to a traffic information output device or the like which is capable of supplying a user with pieces of traffic information that have been effectively synthesized.

2. Description of Related Art

In general, as disclosed in Japanese Patent Laid-Open Application No. 10-47979, there is known a navigation system wherein pieces of traffic information are supplied from a traffic information center by means of FM broadcast or a radio/optical beacon and wherein the supplied pieces of traffic information are displayed on a display monitor through an onboard navigation device. The traffic information center separately collects pieces of traffic information on predetermined regions and transmits the collected pieces of traffic information by means of FM broadcast or the radio/optical beacon. After a vehicle has entered a certain one of the predetermined regions, the onboard navigation device acquires the pieces of traffic information on that region at intervals of a certain period. Thus, this navigation system makes it possible to suitably supply the user with pieces of traffic information on each of the regions.

Due to rapid progress and development of portable terminals such as cellular phones and personal handyphone system (PHS), as a method of acquiring pieces of traffic information, it has become contemplable to provide a system that requests transmission of a certain piece of traffic information on a desired region from the side of a portable terminal capable of outputting pieces of traffic information, that distributes the piece of traffic information on that region from the traffic information center to the side of the portable terminal in response to the request, and that causes the portable terminal to receive the piece of traffic information supplied from the traffic information center. According to this system, the user carries the portable terminal, whereby it becomes possible for the user to acquire pieces of traffic information on an arbitrary one of different regions.

However, while pieces of traffic information on an arbitrary one of different regions can thus be acquired, the pieces of traffic information are actually pieces of information consisting of many pieces of information such as traffic jam information, regulation information, parking space information, service area information, which are each related to a certain region. It is impossible to request transmission of only a desired piece of information (e.g., parking space information) selected from these pieces of information from the side of the portable terminal. As a result, pieces of information that are not desired by the user are displayed on the side of the portable terminal, and the user is not guaranteed of good visibility.

Further, while pieces of traffic information on an extensive range can be acquired, pieces of traffic information on the extensive region which are enormous in amount are displayed on a display screen on the side of the portable terminal with high density. Thus, the state of display becomes complicated. Because data to be distributed are enormous in size, the time required for transmission of the data and the time required for the processing of the data for display are increased. This increase in processing time subsequently leads to an increase in the communication cost as well as a deterioration in responsive characteristics.

SUMMARY OF THE INVENTION

It is an object of the invention to provide a traffic information output device capable of quickly supplying pieces of traffic information that can be easily recognized by a user, and to provide a traffic information distribution device/method capable of effectively distributing useful pieces of the traffic information to the traffic information output device with communication data being small in size.

A traffic information output device in accordance with a first aspect of the invention is designed to synthesize and output pieces of traffic information. According to the first aspect, since the pieces of traffic information are synthesized in consideration of a user's request, recognizability, and the like, the output pieces of the traffic information can be easily recognized by the user. It is to be noted herein that the output pieces of the traffic information may be acoustic information, literal information, or photo image information. It is to be noted herein that the synthesized pieces of the traffic information may be supplied from any one of many different varieties of means including FM broadcast, a radio beacon, an optical beacon, and radio communication.

In the first aspect, it is appropriate that the pieces of the traffic information be synthesized on the basis of at least one of a plurality of factors, that is, road type, road attribute, angle formed by intersecting roads, road width, and the number of roads. Thus, the pieces of the traffic information are effectively synthesized. Therefore, the output pieces of the traffic information are more recognizable and more meaningful for the user.

Furthermore, it is also appropriate that the output portion prohibit those pieces of the traffic information which amount is equal to or less than a predetermined amount from being displayed. Thus, those pieces of the traffic information which are not meaningful enough to be supplied to the user are omitted. Therefore, the output pieces of the traffic information can be easily grasped by the user.

In the first aspect, it is also appropriate that the traffic information output device have a display screen on which a map is displayed and that pieces of the traffic information that have been supplied be synthesized in accordance with a state of display of the map on the display screen (or a range of display of the map on the display screen) and be displayed on the display screen. According to the first aspect, the pieces of the traffic information are synthesized in consideration of a scale of the map displayed on the display screen and/or roads displayed on the display screen. Therefore, the displayed pieces of the traffic information can be more easily recognized by the user.

In a method of distributing pieces of the traffic information in accordance with a second aspect of the invention, pieces of the traffic information are synthesized and distributed. According to the second aspect, the pieces of the traffic information that have been synthesized in advance are distributed. Therefore, the time required for transmission of data on the traffic information to the reception side and the communication costs can be reduced, and the size of data to be processed is significantly reduced and the processing speed can be enhanced on the reception side as well. Thus, it is possible to quickly output pieces of the traffic information that can be easily recognized by the user.

Further, in the second aspect in which the traffic information distribution method is designed to distribute pieces of the traffic information to a traffic information output device having a display screen on which a map is displayed, it is also appropriate that pieces of the traffic information be synthesized in accordance with a state or range of display of the map on the display screen and be distributed. According to this aspect, unwanted pieces of traffic information that are not suited for the state of display of the map on the side of the user are deleted or processed in one way or another on the distribution side, whereby those pieces of the traffic information which match the state or range of display of the map are distributed. Therefore, the time required for transmission and the communication costs can be reduced, and the amount of data on the traffic information to be displayed is significantly reduced on the reception side as well. Thus, pieces of the traffic information that are meaningful for the user can be quickly displayed.

Furthermore, in the second aspect, it is also appropriate that the pieces of traffic information be synthesized on the basis of at least one of a plurality of factors, that is, road type, road attribute, angle formed by intersecting roads, road width, and the number of roads. Thus, the pieces of the traffic information are effectively synthesized on the distribution side in consideration not only of a request made by a user, recognizability at the time of output, a state of display of a map on the display screen, and a range of the map on the display screen but also of various factors in which actual road conditions are reflected. Hence, the time required for transmission and the communication costs can be further reduced, and pieces of the traffic information that are more recognizable and more meaningful for the user can be quickly supplied on the reception side as well.

Furthermore, in the second aspect, it is also appropriate that those pieces of the traffic information whose amount is equal to or less than a predetermined amount be prohibited from being distributed. Thus, those pieces of the traffic information which cannot be recognized by the user or do not make any sense when being displayed on the side of the user are deleted on the distribution side. Therefore, the time required for transmission and the communication costs can be more significantly reduced, and those pieces of the traffic information which are more understandable and more meaningful can be quickly supplied on the reception side as well.

It is also possible to construct a traffic information distribution device by adopting the traffic information distribution method in accordance with the aforementioned second aspect. According to this aspect, the traffic information distribution device adopts the aforementioned traffic information distribution method, and thus makes it possible to distribute pieces of the traffic information that are easily recognizable and meaningful for the user in response to a request made by the user with the communication data having been reduced in size.

It is also possible to constitute another aspect of the invention by a traffic information output device that includes means for transmitting a signal for requesting transmission of pieces of the traffic information to the traffic information distribution device in accordance with the aforementioned aspect, means for receiving pieces of the traffic information from the aforementioned traffic information distribution device, and means for outputting the received pieces of the traffic information. According to this aspect, the traffic information output device is supplied with pieces of the traffic information from the traffic information distribution device and thus makes it possible for the user to acquire pieces of the traffic information suited for his or her request with the period required for transmission being short and with the communication costs being low. Also, since the pieces of traffic information are synthesized on the distribution side, it is possible to quickly output pieces of the traffic information that are easily recognizable and meaningful for the user.

It is also possible to constitute another aspect of the invention by a traffic information output device that includes means for transmitting a signal for requesting transmission of pieces of the traffic information as well as a signal indicating a state or range of a map displayed on the display screen to the traffic information distribution device designed to distribute pieces of the traffic information by means of the traffic information distribution method in accordance with the aforementioned second aspect, means for receiving pieces of the traffic information that have been distributed from the aforementioned traffic information distribution device, and means for outputting the received pieces of the traffic information to the aforementioned display screen.

According to the aforementioned aspect, the traffic information output device can transmit a signal indicating a scale or the like of roads on the display screen as well as a signal for requesting transmission of a desired piece of the traffic information. Thus, the traffic information distribution device can synthesize pieces of the traffic information to be distributed on the basis of appropriate recognition of a state or range of a map displayed on the display screen. Hence, the traffic information output device can receive useful pieces of the traffic information that are closely related to the state or range of roads displayed on the display screen with the period required for transmission and the communication costs having been reduced, and can quickly display them for the user.

BRIEF DESCRIPTION OF THE DRAWINGS

The foregoing and further objects, features and advantages of the invention will become apparent from the following description of exemplary embodiments with reference to the accompanying drawings, wherein like numerals are used to represent like elements and wherein.

DETAILED DESCRIPTION OF PREFERRED EMBODIMENTS

Figure 1:
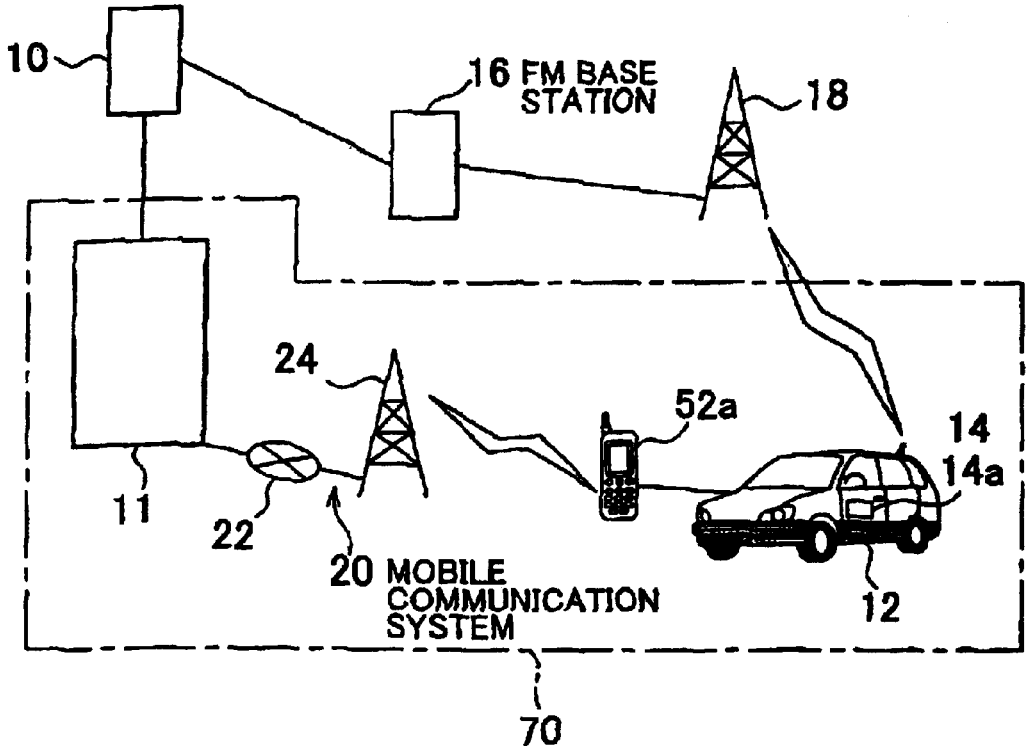
FIG. 1 is an exemplary system configuration view of a traffic information distribution system in accordance with the invention.

FIG. 1 is an exemplary system configuration view of the traffic information distribution system 70 for realizing a traffic information distribution method in accordance with the invention. The traffic information distribution system 70 is generally composed of a traffic information distribution device 11 that will be described later in detail, a traffic information output device 14 capable of outputting traffic information, and a data communication means 52 that is connected to the traffic information output device 14 and that allows bidirectional communication with the traffic information distribution device 11.

As shown in FIG. 1, the traffic information distribution device 11 of the first embodiment is connected to a traffic information center 10, which corresponds to a road traffic information communication system center (VICS center). FIG. 1 also shows a navigation device 14a installed in a vehicle 12 as an example of a traffic information output device 14. A cellular phone 52a as the data communication means 52 is connected to the navigation device 14a.

The traffic information center 10 collects pieces of traffic information on roads concerned such as states of traffic jam, construction, block, and the like, for example, by means of a camera or a sensor or through an artificial operation or the like. FM base stations 16 that are respectively located for regions concerned as an infrastructure are connected to the traffic information center 10. Each of the FM base stations 16 has an FM broadcast antenna 18 and is designed such that traffic information on roads in a predetermined specific region is provided in a transmissible range of the FM broadcast antenna 18. The traffic information center 10 distributes, at intervals of a certain period, traffic information that has been collected as to a region concerned, from the FM broadcast antenna 18 separately for each of the FM base stations 16.

If a signal for requesting transmission of road traffic information in a certain desired region has been received from the reception side through radio communication, the traffic information center 10 can also distribute road traffic information in the desired region that has been requested through a mobile communication system 20.

In addition to the traffic information center 10, the mobile communication system 20 is connected to the traffic information distribution device 11 of the traffic information distribution system 70. The mobile communication system 20 is provided with exchanges (not shown), a network 22 through which the exchanges are connected, and a plurality of antennae 24 through which signals are transmitted to and received from the cellular phone 52a in a predetermined range. Thus, the traffic information distribution device 11 can be connected to the cellular phone 52a through a line by means of the mobile communication system 20, and can realize bidirectional radio communication.

As a result, a user can receive traffic information on other regions through the traffic information distribution device 11 by accessing the traffic information distribution device 11 by means of the cellular phone 52a, when the information is not available from FM broadcast of the traffic information center 10. For this purpose, the traffic information center 10 supplies the traffic information distribution device 11 with pieces of traffic information on all regions.

It is to be noted herein that the pieces of traffic information distributed by the traffic information center 10 include various pieces of traffic information separately predetermined according to regions, such as traffic jam information, regulation information, parking space information, and service area information, and that traffic information on one region which is distributed at a certain time is always consistent in terms of its contents whether a request has been made on the reception side or not.

It is useful that the traffic information distribution system 70 be able to provide only a certain piece of traffic information corresponding to a request made by the user if the user requests only that piece of traffic information to be output while there are many different pieces of traffic information. Next, the traffic information distribution system 70 in accordance with the first embodiment which makes it possible to supply such useful traffic information will be described in detail.

Figure 2:
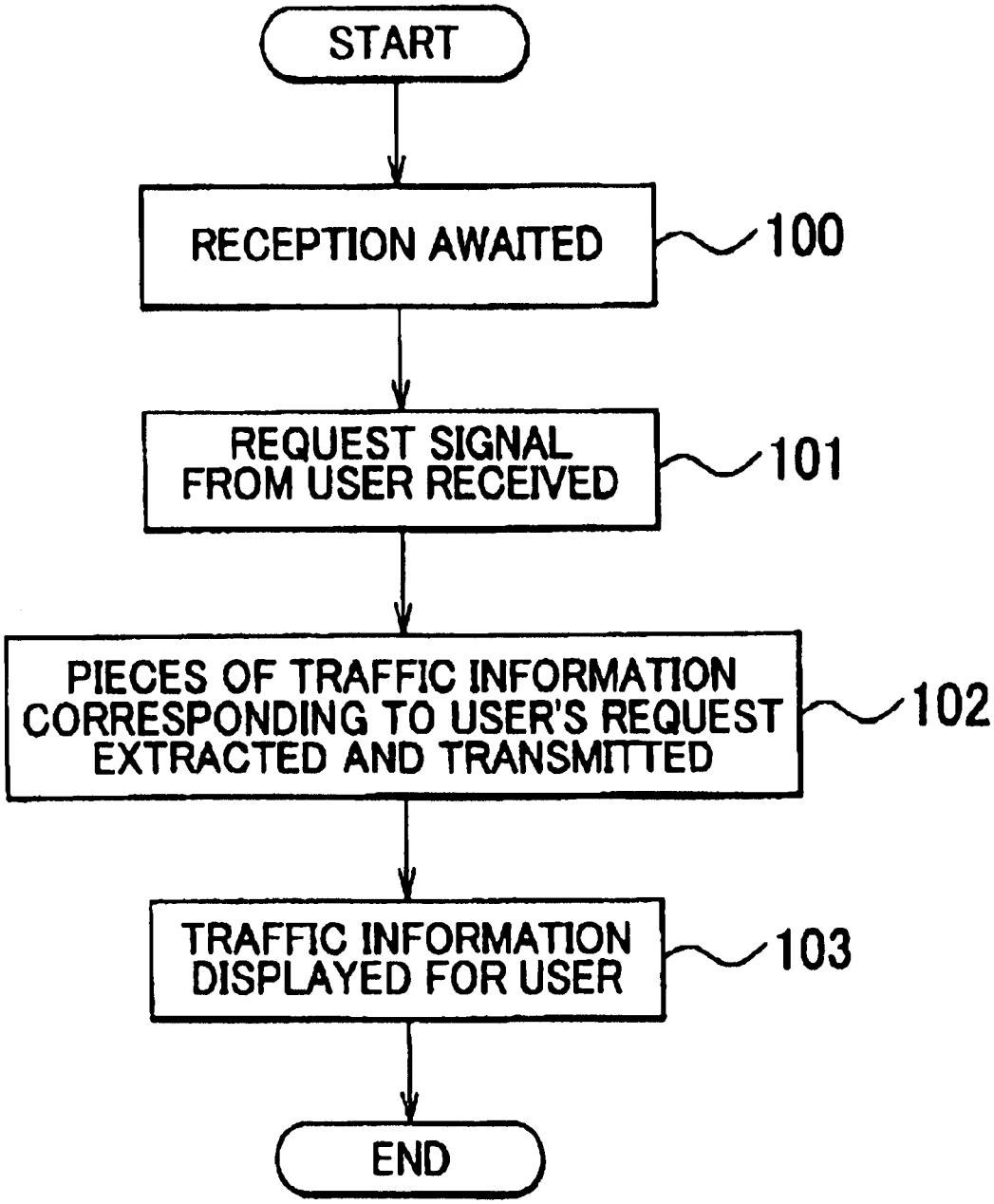
FIG. 2 is an exemplary flowchart showing the operation of the traffic information distribution system in accordance with a first embodiment of the invention.

FIG. 2 is an exemplary flowchart showing the operation of the traffic information distribution system 70 in accordance with the first embodiment.

In step 100, the traffic information distribution device 11 waits to receive a signal from the cellular phone 52a of the navigation device 14a. Then in step 101, the traffic information distribution device 11 receives a request signal for requesting transmission of a desired piece of traffic information (e.g., only parking space information) from the cellular phone 52a.

In step 102, the traffic information distribution device 11 transmits the traffic information requested from the cellular phone 52a in response to the aforementioned request signal. More specifically, the traffic information distribution device 11 extracts only the requested piece of traffic information (parking space information) from pieces of traffic information supplied from the traffic information center 10, produces transmission data, and transmits them to the cellular phone 52a. However, the traffic information distribution device 11 can also be designed to produce transmission data corresponding to each request signal in advance (in step 100) and to transmit transmission data corresponding to each of the request signals upon reception thereof (in step 102), so as to shorten a period from the reception of a request signal to the transmission of transmission data. It is to be noted herein that the aforementioned transmission data are produced on the basis of the latest traffic information supplied from the traffic information center 10.

In step 103, the navigation device 14a displays traffic information on a display monitor 40 on the basis of the transmission data received by the cellular phone 52a, whereby the operation of the traffic information distribution system 70 in accordance with the first embodiment is terminated.

In the case where the user requests traffic jam information, it is also appropriate in step 102 that the traffic information distribution device 11 delete pieces of traffic jam information indicating, for example, uncertainty/no traffic jam/crowdedness and extract only pieces of traffic jam information indicating, for example, traffic jam. This process is based on the fact that the user is only interested to know whether or not there is a traffic jam in a general sense.

The navigation device 14a for realizing the aforementioned steps 101 and 103 will now be described in detail.

Figure 3:
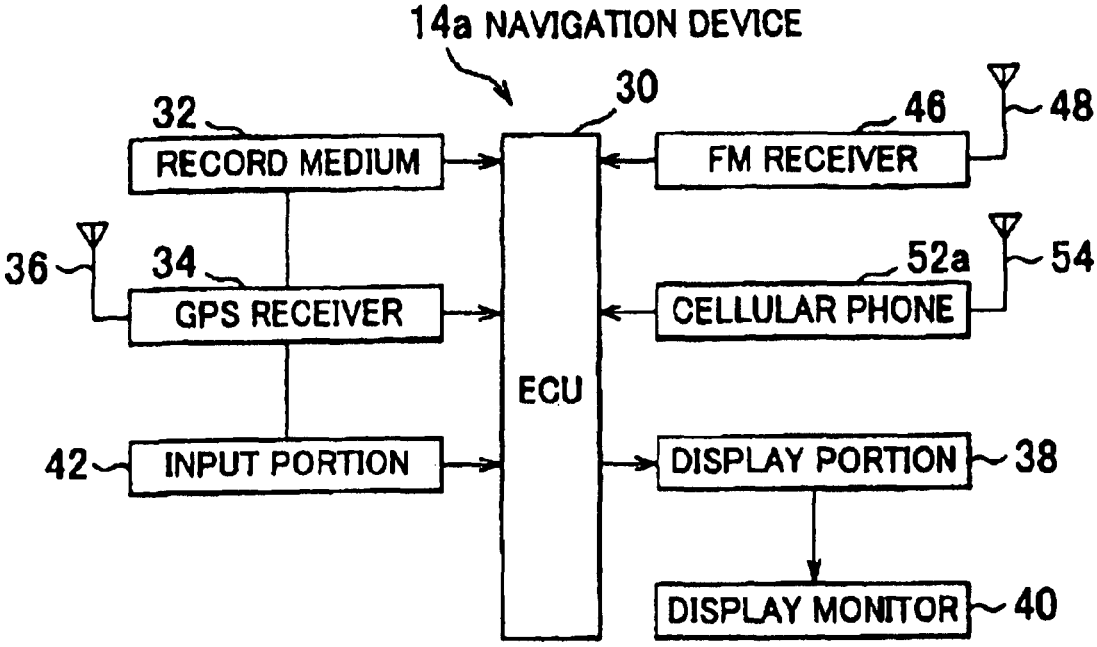
FIG. 3 is an exemplary block diagram of a navigation device.

FIG. 3 is an exemplary block diagram of the navigation device 14a mounted in the vehicle 12 as an exemplary traffic information output device 14. As shown in FIG. 3, the navigation device 14a is provided with an electronic control unit (hereinafter referred to as an ECU) 30. A record medium 32 such as a CD-ROM or a DVD is connected to the ECU 30. Map information is recorded on the record medium 32.

The navigation device 14a is provided with a GPS receiver 34, which has a GPS antenna 36. The GPS receiver 34 receives a signal output by a GPS satellite via the GPS antenna 36. The GPS receiver 34 converts the received signal into a signal in a predetermined form and supplies it to the ECU 30. The ECU 30 calculates a measurement position corresponding to a current position of the vehicle on the basis of the signal supplied from the GPS receiver 34.

The navigation device 14a is provided with a display portion 38. The display monitor 40, which is disposed at a position visible from the user in a compartment, is connected to the display portion 38. The ECU 30 supplies the display portion 38 with image data which consist of a current position of the vehicle and map information on an area around the current position. The display portion 38 displays the map information on the area around the current position of the vehicle on the display monitor 40 in a renge corresponding to the scale of the map, on the basis of the image data supplied from the ECU 30.

The navigation device 14a is provided with an input portion 42 that can be operated by the user. The input portion 42 is composed, for example, of a switch for scrolling a map displayed on the display monitor 40 and a switch for changing the scale of the map or a menu button of a menu screen displayed on the display monitor 40. The input portion 42 is connected to the ECU 30 and supplies the ECU 30 with signals corresponding to various contents that have been input.

The navigation device 14a is provided with the cellular phone 52a, which has an antenna 54. The cellular phone 52a is designed to allow bidirectional communication with another cellular phone or a subscriber's phone through the antenna 54, by means of the mobile communication system 20 (see FIG. 1). The cellular phone 52a is designed to allow a signal to be transmitted to and received from the ECU 30 of the navigation device 14a.

The cellular phone 52a of the navigation device 14a transmits a request signal for requesting transmission of traffic information to the traffic information distribution device 11, under a situation in which the cellular phone 52a is connected to the traffic information distribution device 11 through a line, via the mobile communication system 20. It is appropriate that a request signal be transmitted by operating the input portion 42 of the navigation device 14a. For example, if a desired request content is selected or input from the menu screen on the display monitor 40, a request signal corresponding to the request content is transmitted from the cellular phone 52a to the traffic information distribution device 11.

If transmission data on traffic information corresponding to a request signal have been received from the traffic information distribution device 11 under a situation in which the cellular phone 52a of the navigation device 14a is connected to the traffic information distribution device 11 through a line via the mobile communication system 20, the cellular phone 52a converts the transmission data into a signal in a predetermined form and supplies it to the ECU 30. The ECU 30 supplies the display portion 38 with a video signal corresponding to the supplied signal, and displays the supplied traffic information in such a manner as to correspond to map display on the display monitor 40.

It is useful that the traffic information distribution system 70 be able to supply required traffic information in consideration of visibility of the display as well as a request made by the user. Next, the traffic information distribution system 70 in accordance with the second embodiment which makes it possible to supply such useful traffic information will be described in detail.

Figure 4:
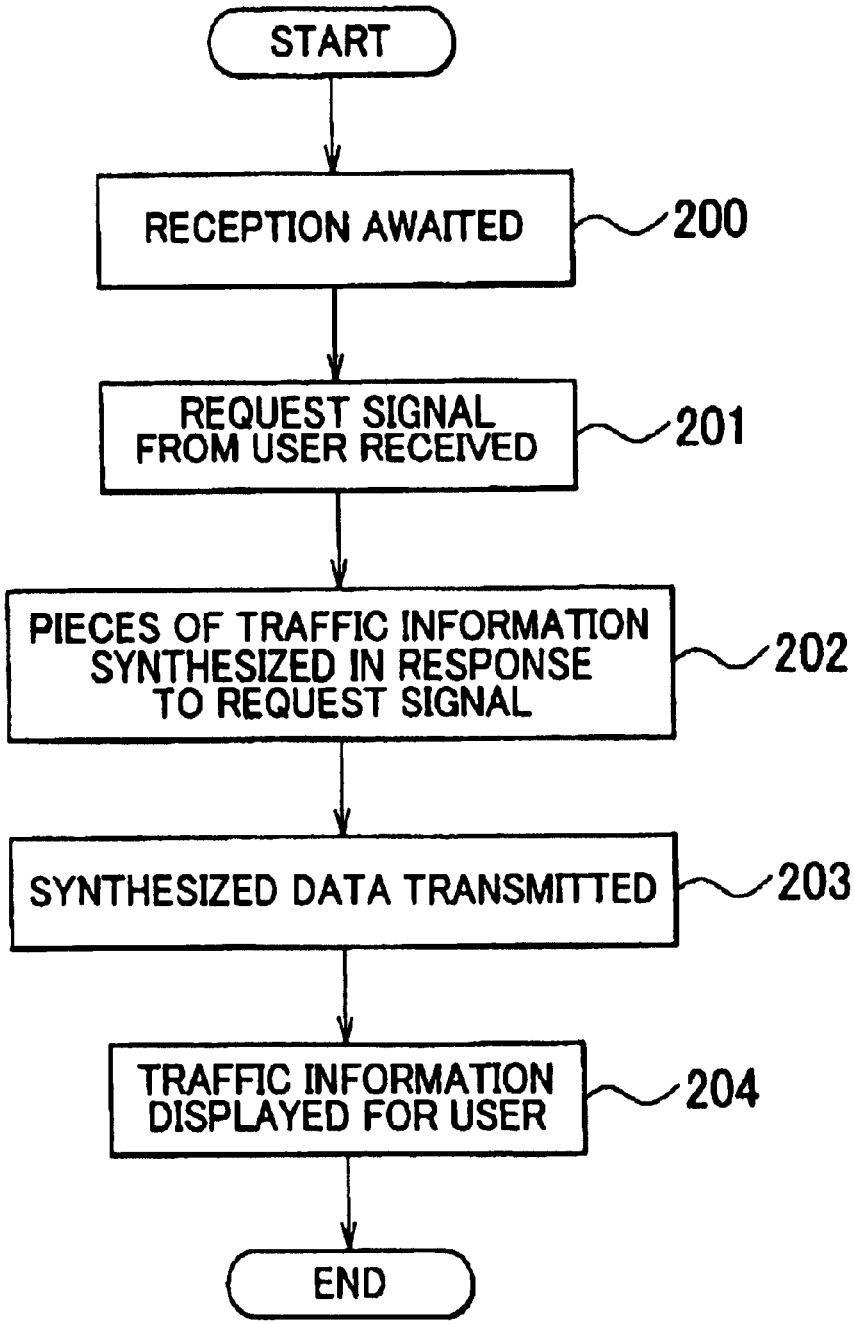
FIG. 4 is an exemplary flowchart showing the operation of the traffic information distribution system in accordance with a second embodiment of the invention.

FIG. 4 is an exemplary flowchart showing the operation of the traffic information distribution system 70 in accordance with the second embodiment.

In step 200, the traffic information distribution device 11 waits to receive a signal from the cellular phone 52a of the navigation device 14a. Then in step 201, the traffic information distribution device 11 receives a request signal for requesting transmission of desired traffic information (e.g., traffic jam information) on a certain region from the cellular phone 52a.

In step 202, the traffic information distribution device 11 extracts only the requested pieces of traffic information (traffic jam information on the region) from pieces of traffic information supplied from the traffic information center 10 in response to the aforementioned request signal, synthesizes the extracted pieces of traffic information in consideration of visibility on the display side (as will be described later in detail), and produces transmission data on the "synthesized pieces of traffic information" (hereinafter referred to as synthesized data).

In step 203, the aforementioned synthesized data are transmitted to the cellular phone 52a. However, the traffic information distribution device 11 can also be designed to produce synthesized data corresponding to each request signal in advance (in step 200) and to transmit synthesized data corresponding to each of the request signals upon reception thereof (in step 203), so as to shorten a period from the reception of a request signal to the transmission of synthesized data. It is to be noted herein that the aforementioned synthesized data are produced on the basis of the latest traffic information supplied from the traffic information center 10.

In step 204, the navigation device 14a portrays traffic information on the display monitor 40 on the basis of the synthesized data received by the cellular phone 52a, whereby the operation of the traffic information distribution system 70 in accordance with the second embodiment is terminated.

A method of synthesizing for creating "synthesized traffic information" by means of the traffic information distribution device 11 in the aforementioned step 203 will now be described in detail.

Figure 5A:
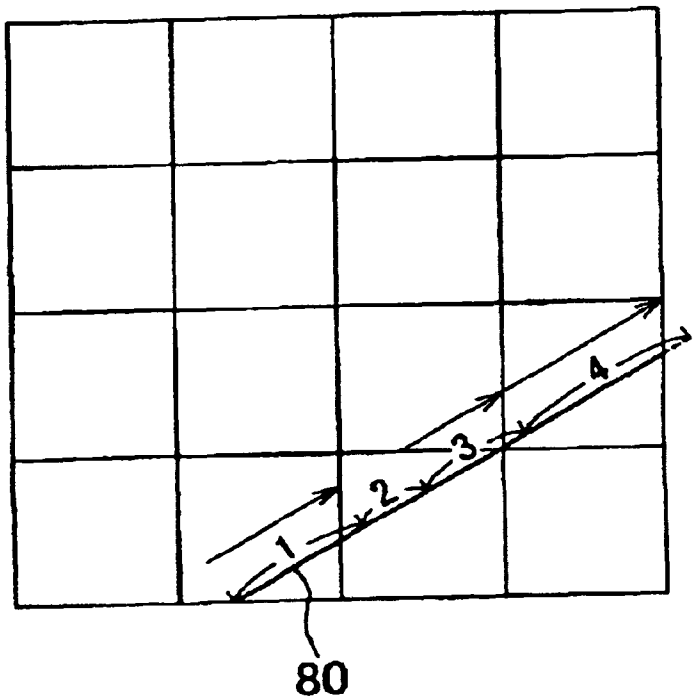
FIGS. 5A–B are exemplary schematic views of a method of synthesizing, and show states of displays before and after synthesizing in accordance with the invention.
Figure 5B:
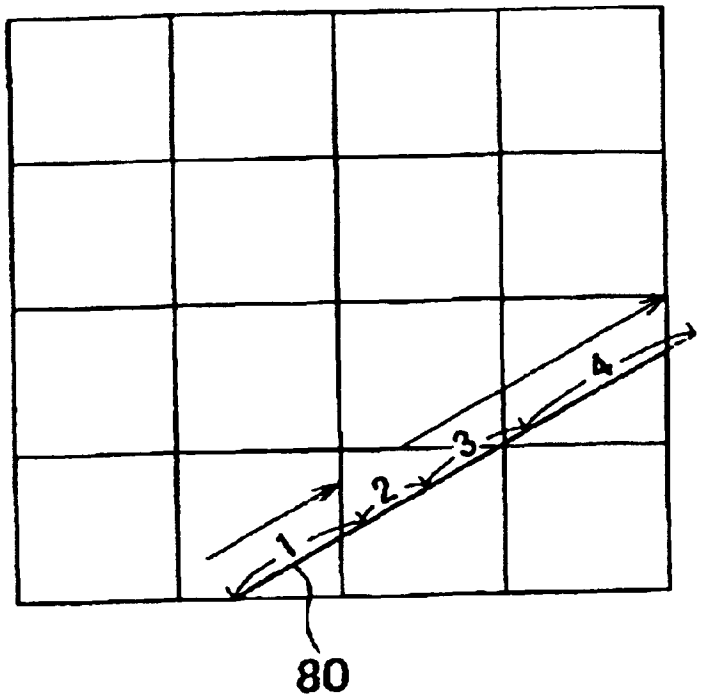

FIG. 5A is an exemplary schematic view of an effective method of synthesizing in accordance with the invention, and shows a state of display of traffic information supplied from the traffic information center 10 on the display monitor 40 of the navigation device 14a. FIG. 5B is an exemplary schematic view of an effective method of synthesizing in accordance with the invention, and shows a state of display of traffic information that has been supplied from the traffic information center 10 and synthesized. It is to be noted in FIGS. 5A and 5B that a reference numeral 80 denotes a road and that arrows denote a direction of traffic jam.

As for traffic jam information as traffic information supplied from the traffic information center 10, the road is divided into a plurality of sections to which link numbers are assigned respectively, and a degree of traffic jam (uncertainty/no traffic jam/crowdedness/traffic jam) is indicated for each of the link numbers. FIG. 5A shows a general state of display of traffic information, with the link numbers 1, 3, and 4 being designated as "traffic jam" and the link number 2 being designated as "no traffic jam".

Although the degree of traffic jam is consistent in the sections indicated by the link numbers 3, 4 and these sections are connected without a break, the two arrows are separately shown in FIG. 5A. These two arrows are synthesized into one arrow, which is shown in FIG. 5B. By thus synthesizing the arrows, the size of data to be distributed is reduced, and the visibility of the state of display on the display monitor 40 of the navigation device 14a is improved.

Figure 6B:
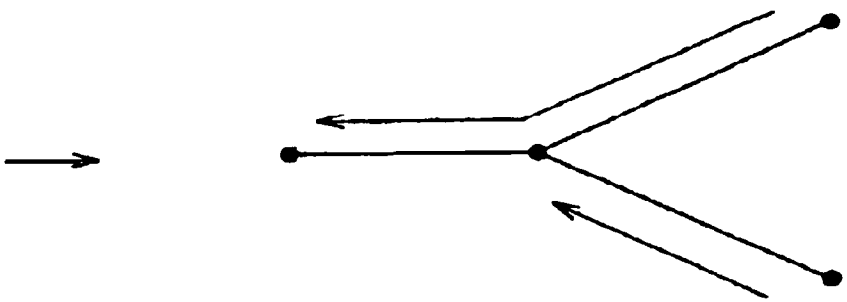
FIGS. 6A–B are exemplary schematic views of another method of synthesizing, and show states of displays before and after synthesizing in accordance with the invention.
Figure 6A:
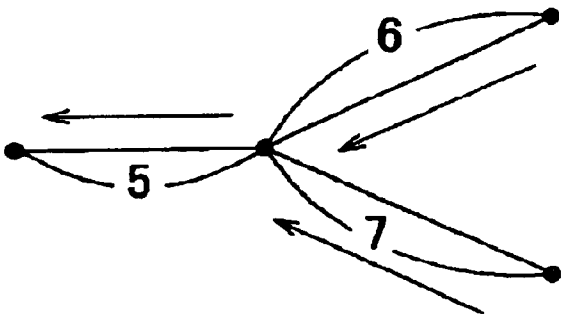

FIG. 6A is an exemplary schematic view of another effective method of synthesizing. FIG. 6A shows a general state of display of traffic information, with the link numbers 5, 6, and 7 being designated as "traffic jam". In consideration of factors mentioned below, it is determined whether pieces of traffic information supplied from the traffic information center 10 are to be synthesized, and it is determined the sections of which link numbers are to be synthesized in the case of synthesis. The factors include: (1) road types such as national highway, prefectural route, expressway, open road, and the like; (2) road attributes indicative of route number such as National Highway 1, National Highway 2, and Belt Highway 8; and (3) angles formed by intersecting roads (e.g., an angle formed by two intersecting roads). Other factors such as: (4) road width; (5) situations at intersections; (6) statistical values obtained from traffic volumes that have actually been measured; and (7) the number of roads may be considered as well.

For example, if the link numbers 5, 6 are identical in road type or road attribute, or if the road corresponding to the link number 6 is wider than the road corresponding to the link number 7, arrows corresponding to the link numbers 5, 6 are synthesized into one arrow as is apparent from FIG. 6B, which is an exemplary schematic view of another effective method of synthesizing. The priorities of the aforementioned factors may be determined in advance or be set individually and specifically.

Figure 7B:
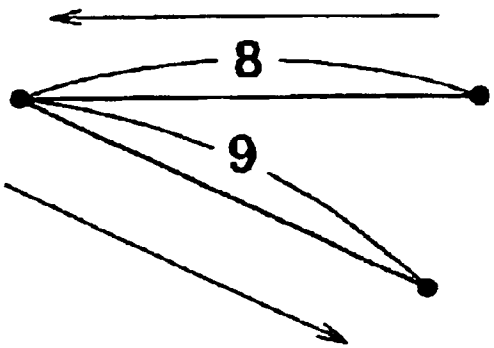
FIGS. 7A–B are exemplary schematic views of cases where synthesizing is not carried out in accordance with the invention.
Figure 7A:
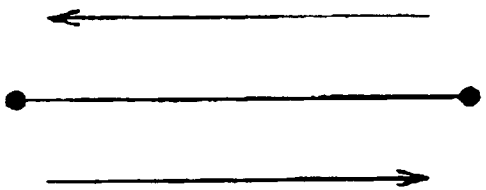

FIG. 7A is an exemplary schematic view for explaining a method of synthesizing which takes the factor "(3) angles of intersecting roads" into account. FIG. 7A shows a general state of display of traffic information, with a certain one of the link numbers being designated as "traffic jam" in both "up" and "down" directions. FIG. 7B is an exemplary schematic view for explaining a method of synthesizing which takes the factor "(3) angles of intersecting roads" into account. FIG. 7B shows a general state of display of traffic information, with the link numbers 8, 9 being designated as "traffic jam". If these two arrows are synthesized into one arrow, U-turn is indicated in the case where the angle formed by intersecting roads (which are actually identical) before synthesis is zero as shown in FIG. 7A. In the case where the angle of intersecting roads before synthesizing is an acute angle as shown in FIG. 7B, synthesizing does not lead to an improvement in visibility, and on the contrary, adversely affects visibility. In the case where such synthesizing does not make any sense, pieces of traffic information supplied from the traffic information center 10 are not synthesized.

If the user is supplied with traffic information on a particularly extensively ranging region, the size of communication data is enormous. Hence, the time required for transmission increases, which brings about a deterioration in responsive characteristics and an increase in communication cost. Moreover, if all the pieces of traffic information that have been received are displayed, the contents to be displayed become complicated and visibility is adversely affected. In such a case, it is useful that further synthesized pieces of traffic information be available in consideration of the state of display of the map on the display monitor 40 of the navigation device 14a where traffic information is to be displayed. Next, the traffic information distribution system in accordance with the third embodiment which makes it possible to supply such useful traffic information will be described in detail.

Figure 8:
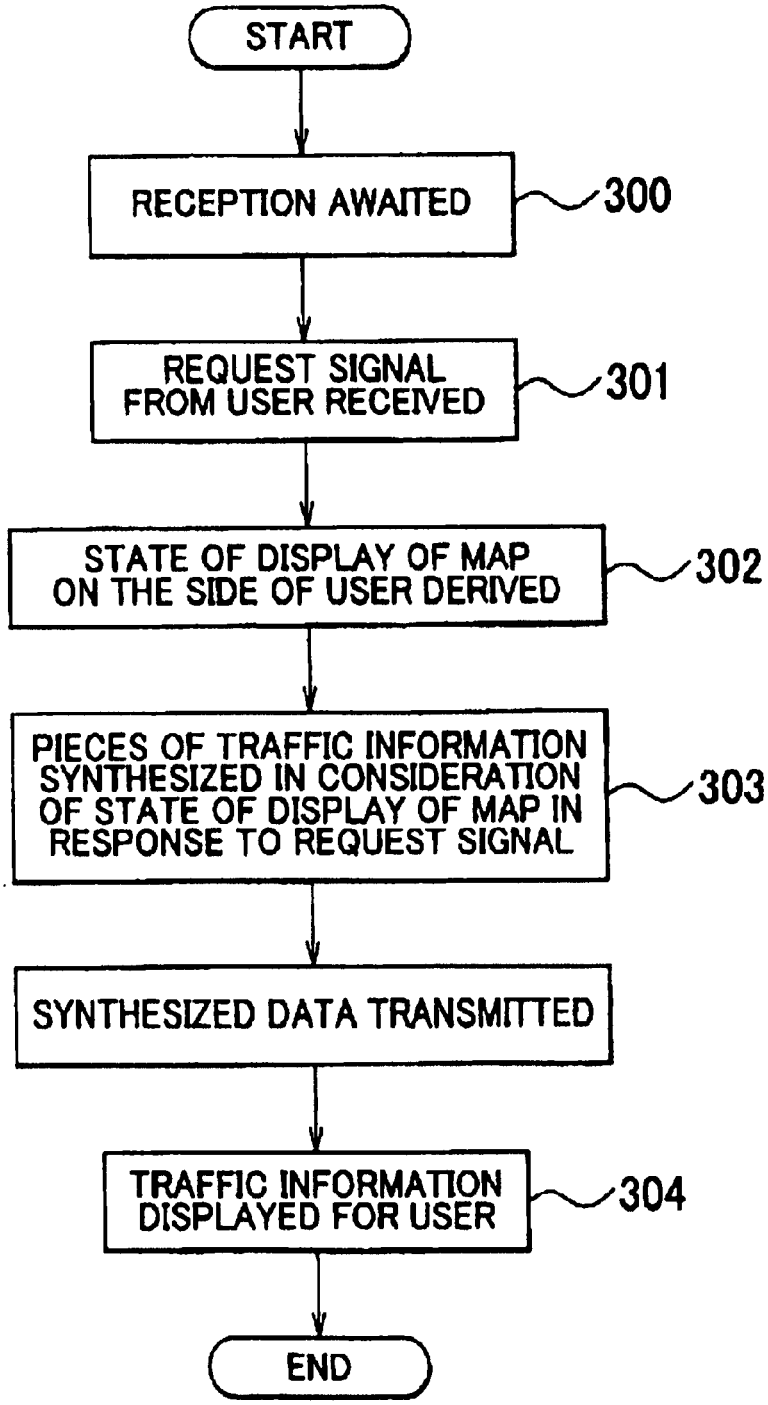
FIG. 8 is an exemplary flowchart showing the operation of the traffic information distribution system in accordance with a third embodiment of the invention.

FIG. 8 is an exemplary flowchart showing the operation of the traffic information distribution system 70 in accordance with the third embodiment.

In step 300, the traffic information distribution device 11 waits to receive a signal from the cellular phone 52a of the navigation device 14a. Then in step 301, the traffic information distribution device 11 receives a request signal for requesting transmission of a desired piece of traffic information (e.g., information on traffic jam) on a plurality of extensively ranging regions from the cellular phone 52a.

In step 302, the traffic information distribution device 11 derives a state of display of a map on the display monitor 40 of the navigation device 14a to which the request signal has been transmitted, that is, a scale of the map on the display monitor 40. The traffic information distribution device 11 also derives states of display of a map that may be derived from the scale, that is, roads displayed on the display monitor 40. It is also appropriate that these states of display of the maps be derived on the basis of a signal indicative of the scale of a map superposed on the request signal or be derived on the basis of an estimation made as to a plurality of regions that have been requested.

In step 303, the traffic information distribution device 11 extracts only requested pieces of traffic information (traffic jam information on regions that have been requested) from pieces of traffic information supplied from the traffic information center 10 in response to the aforementioned request signal, synthesizes the extracted pieces of traffic information in consideration of the aforementioned state of display of the map (as will be described later in detail), further synthesizes the synthesized pieces of traffic information with the aid of a second method of synthesis in case of necessity, and produces synthesized data to be distributed.

In step 304, the aforementioned synthesized data are transmitted to the cellular phone 52a. However, the traffic information distribution device 11 can also be designed to produce synthesized data corresponding to each request signal in advance (in step 300) and to transmit the synthesized data corresponding to each of the request signals upon reception thereof (in step 304), so as to shorten a period from the reception of a request signal to the transmission of synthesized data. It is to be noted herein that the aforementioned synthesized data are produced on the basis of the latest traffic information supplied from the traffic information center 10.

n step 305, the navigation device 14a portrays traffic information on the display monitor 40 on the basis of the synthesized data received by the cellular phone 52a, whereby the operation of the traffic information distribution system in accordance with the third embodiment is terminated.

A method of synthesizing for creating "synthesized traffic information" by means of the traffic information distribution device 11 in the aforementioned step 303 will be described in detail.

Figure 9B:
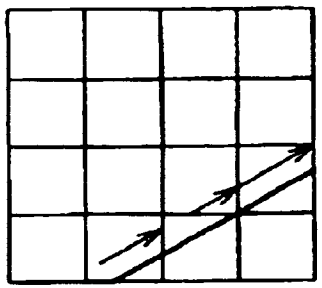
FIGS. 9A–C are exemplary schematic views of a method of synthesizing in which the scale of a map on a display monitor is taken into account, and show states of displays before and after contraction and synthesizing.
Figure 9C:
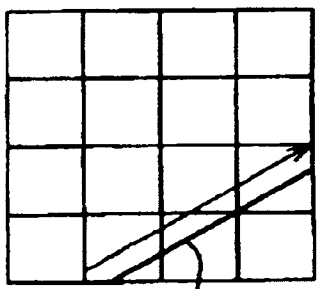
Figure 9A:
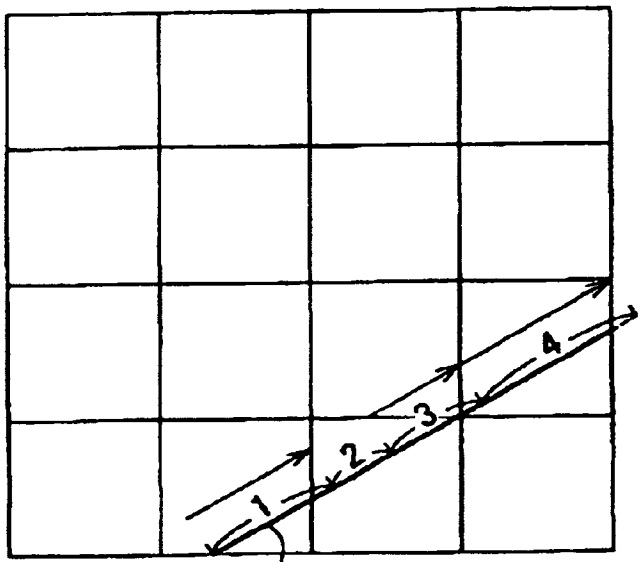

FIG. 9A is an exemplary schematic view of method of synthesizing which takes the scale of a map on the display monitor 40 into account. FIG. 9A shows a general state of traffic information supplied from the traffic information center 10 on the display monitor 40 of the navigation device 14a. FIG. 9B shows a state of display obtained by contracting the state of display shown in FIG. 9A. FIG. 9C shows a state of display obtained by synthesizing pieces of traffic information supplied from the traffic information center 10 and contracting the state of display shown in FIG. 9A.

Thus, if the traffic information is displayed on a map covering an extensive range, arrows cut across one another and the state of display becomes complicated as is apparent from FIG. 9B. This state of display is inconvenient for the user. Although not shown, it would be easily understandable that if the information is displayed on a map covering a more extensive range, the state of display will become more complicated.

That is, the information on the link number 2 designated as "no traffic jam" becomes less visible (the leading end of an arrow corresponding to the link number 1 is coupled to the rear end of an arrow corresponding to the link number 3) as the scale is reduced (i.e., as the range to be covered becomes more extensive). If the scale is further reduced, the arrows corresponding to the link numbers 1, 3, and 4 overlap with one another as well, which leads to an increase in complicatedness. In such a case, the traffic information distribution device 11 synthesizes the three arrows corresponding to the link numbers 1, 3, and 4 into one arrow as shown in FIG. 9C, and transmits synthesized data, which serve to display a single arrow extending from the initial point of the section corresponding to the link number 1 to the end point corresponding to the link number 4, to the cellular phone 52a.

It is to be noted herein that the section corresponding to the link number 2 is designated as "traffic jam". However, as described above, if this section on the display monitor 40 is unrecognizable or does not have such a length as is to be designated as "no traffic jam", the user is not confronted with any inconvenience. That is, this method of synthesizing is desirable from the standpoint of grasping an overall traffic situation, and is rather advantageous in that a user, especially a driver can quickly grasp a traffic situation.

Figure 10B:
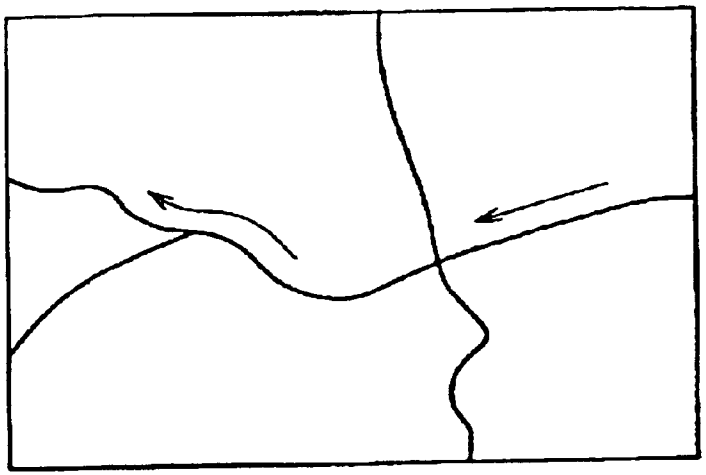
FIGS. 10A–B are exemplary schematic views of an exemplary method of synthesizing in which the state of a road displayed on the display monitor is taken into account, and show states of displays before and after synthesizing.
Figure 10A:
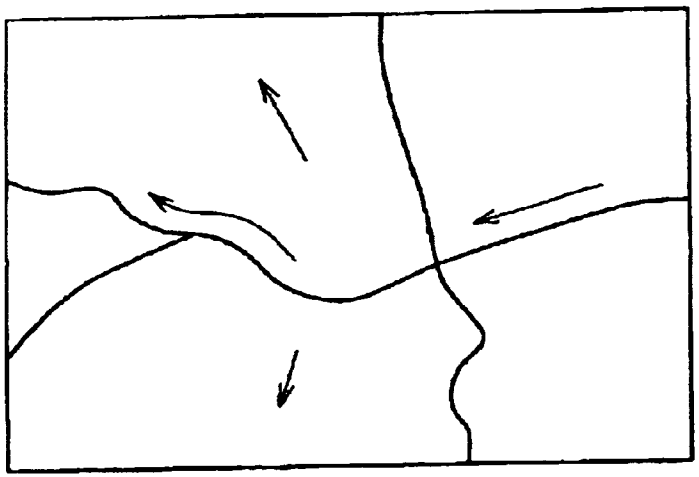

FIG. 10A is an exemplary schematic view of method of synthesizing which takes the conditions of roads displayed on the display monitor 40 into account. FIG. 10A shows a general state of display of traffic information supplied from the traffic information center 10 on the display monitor 40 of the navigation device 14a. FIG. 10B is an exemplary schematic view of a method of synthesizing which takes the conditions of roads displayed on the display monitor 40 into account. FIG. 10B shows a state of display where pieces of traffic information supplied from the traffic information center 10 have been synthesized.

Traffic jam information on roads that are not displayed on the display monitor 40 is shown in FIG. 10A. For example, when displaying a map covering an extensive range as a rule, the navigation device 14a displays only arterial roads instead of displaying all the roads in minute detail, thus controlling the amount of information to be displayed. In general, traffic jam information on roads that are not displayed on the display monitor 40 increases in proportion to a decrease in scale. In FIG. 10B, traffic jam information is displayed with traffic jam information on roads that are not displayed on the display monitor 40 having been deleted. Thus, by deleting traffic jam information that does not make any sense to the user when displayed, it becomes possible not only to reduce the size of communication data but also to improve visibility. The processing of deleting unwanted information may be performed in consideration of the various factors in the second embodiment.

It is useful that the range of a map on the display monitor 40 of the navigation device 14a where traffic information is to be displayed (i.e., the range of a map projected onto a display range of the display monitor 40) be completely grasped and that the supply of pieces of traffic information that have been further synthesized in accordance with the map range be made possible. Next, the traffic information distribution system 70 in accordance with the fourth embodiment which makes it possible to supply such useful traffic information will be described in detail.

Figure 11:
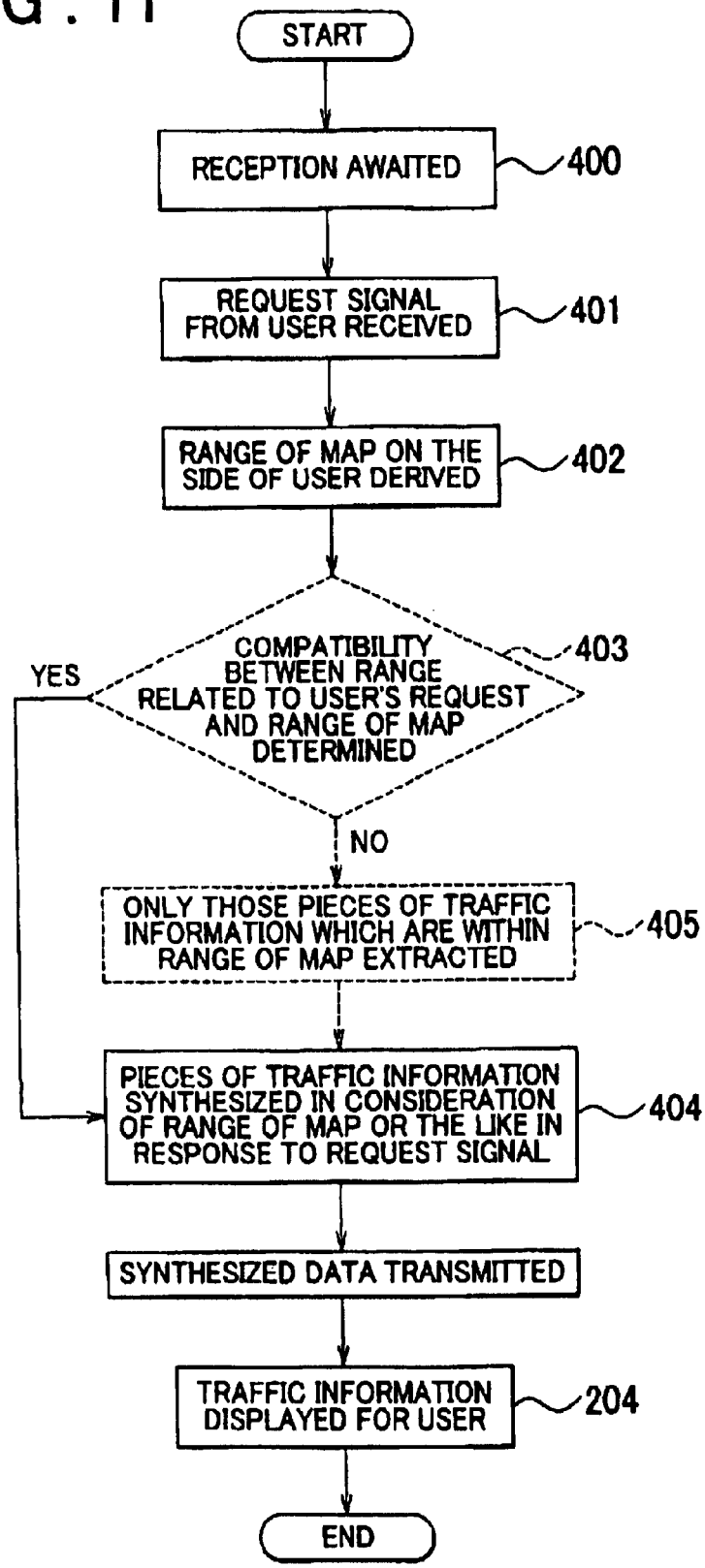
FIG. 11 is an exemplary flowchart showing the operation of the traffic information distribution system in accordance with a fourth embodiment of the invention.

FIG. 11 is an exemplary flowchart showing the operation of the traffic information distribution system 70 in accordance with the fourth embodiment.

In step 400, the traffic information distribution device 11 waits to receive a signal from the cellular phone 52a of the navigation device 14a. Then in step 401, the traffic information distribution device 11 receives a request signal for requesting transmission of a desired piece of traffic information (e.g., traffic jam information) from the cellular phone 52a.

In step 402, the traffic information distribution device 11 derives a map range of the display monitor 40 of the navigation device 14a to which a request signal has been transmitted. It is also appropriate that the traffic information distribution device 11 further display the map such as the scale as mentioned above. It is appropriate that a signal for specifying such a map range be superposed on the aforementioned request signal and be transmitted from the cellular phone 52a to the traffic information distribution device 11.

In step 403, the traffic information distribution device 11 extracts only requested pieces of traffic information (traffic jam information on a region that has been requested) from pieces of traffic information supplied from the traffic information center 10 in response to the aforementioned request signal. Further in step 403, the traffic information distribution device 11 may determine whether the region corresponding to the request is included in the map range. In such a case, if the region corresponding to the request is included in the map range, the operation proceeds to step 404. If the region corresponding to the request is not included in the map range, the operation may proceed to step 405.

In step 405, pieces of traffic information on regions that are not included in the map range of the navigation device 14a are deleted, and the operation proceeds to step 404. In this case, a signal indicating that information on part of a requested region has not been transmitted because the region is not included in the map range may be superposed on the synthesized data so as to draw the user's attention.

In step 404, pieces of traffic information that have either been extracted or been extracted and deleted are synthesized with the aid of the method of synthesis in accordance with the aforementioned third embodiment. Moreover, the synthesized pieces of traffic information are synthesized by the method of synthesizing in accordance with the aforementioned second embodiment if necessary, and synthesized data to be distributed are produced.

In step 406, the aforementioned synthesized data are transmitted to the cellular phone 52a. However, the traffic information distribution device 11 can also be designed to produce synthesized data corresponding to each request signal in advance (in step 400) and to transmit synthesized data corresponding to each of the request signals upon reception thereof (in step 406), so as to shorten a period from the reception of a request signal to the transmission of synthesized data. It is to be noted herein that the aforementioned synthesized data are produced on the basis of the latest traffic information supplied from the traffic information center 10.

In step 407, the navigation device 14a portrays traffic information on the basis of the synthesized data received by the cellular phone 52a, whereby the operation of the traffic information distribution system 70 in accordance with the fourth embodiment is terminated. Although the additional determination made in step 403 is arbitrary, unwanted traffic information resulting from erroneous input operations performed by the user can be prevented from being transmitted.

Figure 12:
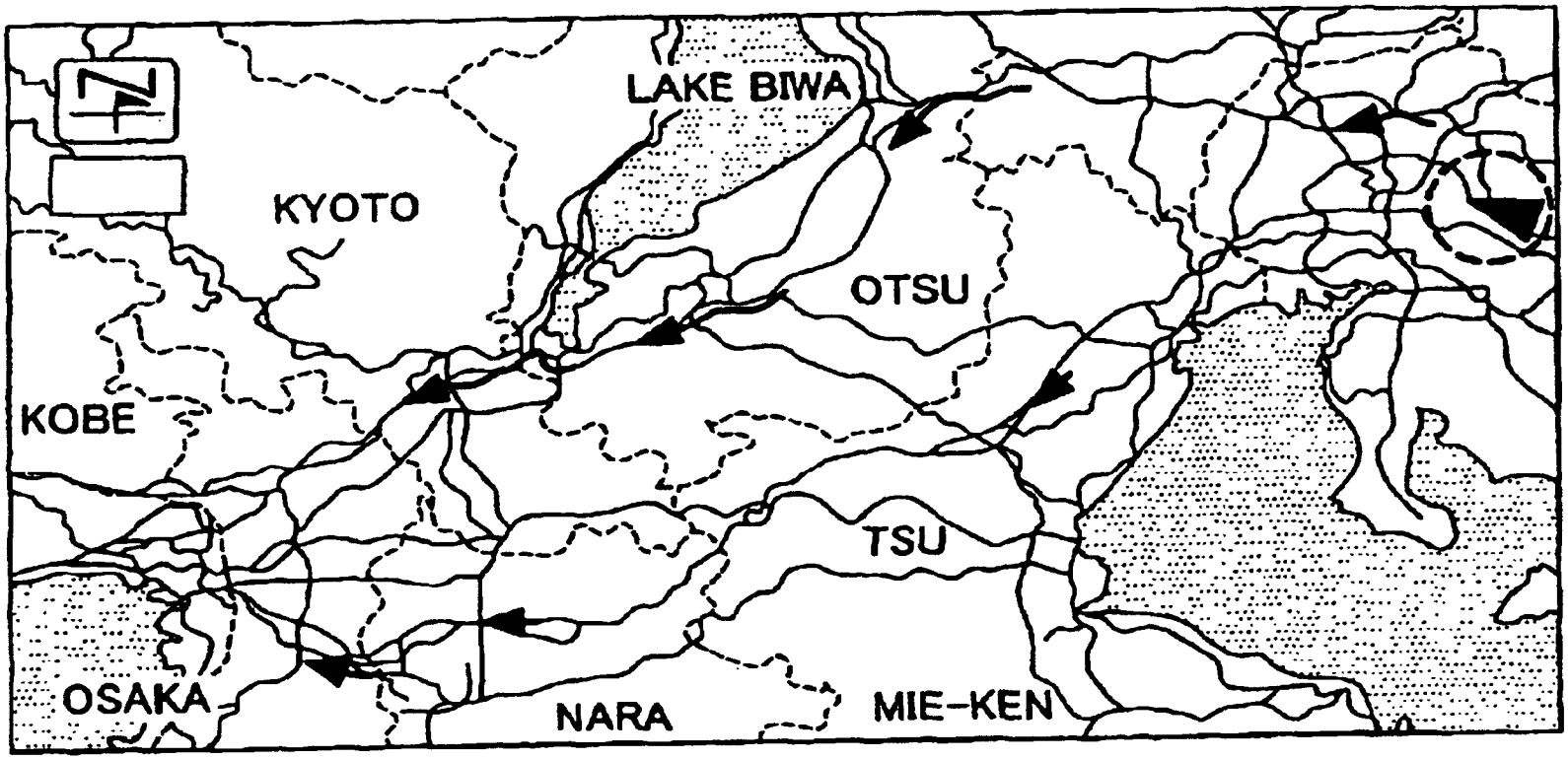
FIG. 12 shows an exemplary state of display of traffic information synthesized by the invention on the display monitor of the navigation device.

FIG. 12 shows an exemplary display of pieces of traffic information synthesized by the method of synthesizing in accordance with the invention. In FIG. 12, pieces of traffic information on a plurality of regions are synthesized and portrayed on a map covering an extensive range. As is apparent from FIG. 12, the state of display makes it possible for the user to easily understand the contents of traffic information merely by having a glance at the screen while driving. Especially in the case where the user drives the vehicle, these pieces of traffic information which can be grasped at once are more useful than precise but detailed pieces of traffic information that cannot be easily grasped at once.

In the aforementioned embodiments, when pieces of traffic information that have been synthesized are displayed on the display monitor 40, it is appropriate that later-described step 500 be performed in the respective embodiments (e.g., step 303, 404, and the like), if the amount of the information is still equal to or less than a predetermined amount and makes it difficult for the user to recognize the contents of the information. In step 500, those pieces of traffic information whose amount is equal to or less than the predetermined amount are deleted. Thus, those pieces of traffic information which will not make any sense even by being synthesized are deleted. Thus, the size of communication data of traffic information to be distributed is further reduced.

For example, when traffic jam is indicated, an arrow that is too short to indicate any direction when displayed makes it impossible for the user to receive information whose amount is much than the predetermined amount, and thus is regarded as containing information whose amount is equal to or less than the predetermined amount. As a result, this arrow is deleted. This predetermined amount as a criterion for determining whether or not a certain arrow is to be deleted may be set on the basis of a state of display on the display monitor 40. For example, in the case where traffic jam information is indicated on a relatively large scale, since the map range on the display monitor 40 is narrow, the distance of road sections that are to be deleted after synthesizing (not a distance on the display monitor 40 but an actual distance) is set relatively short. On the other hand, when traffic jam information is indicated on a relatively small scale, since the map range on the display monitor 40 is extensive, the distance of road sections that are to be deleted after synthesizing is set relatively long. It is obvious that step 500 is applicable to pieces of traffic information that have not been synthesized as well as pieces of traffic information that have been synthesized.

As described above, according to the traffic information distribution system 70 in accordance with the aforementioned embodiments, the size of communication data is reduced by the aforementioned various methods of synthesizing, and the period required for transmission and the communication cost can be reduced. In addition, traffic information with improved visibility can be quickly supplied.

It is to be noted herein that the "synthesizing of pieces of traffic information" mentioned in the present specification means "conversion of data of original traffic information into data of traffic information which are smaller in size irrespective of the mode of conversion" and is to be broadly construed as covering extraction, deletion, and the like of traffic information as described in the aforementioned embodiments.

Although the preferred embodiments of the invention have been described hitherto in detail, it is obvious that the invention is not to be limited to those embodiments.

For example, although the methods of synthesizing of traffic information have been described in the aforementioned embodiments, those skilled in the art could understand that the aforementioned methods can be substituted, combined, changed, etc.

Figure 13A:
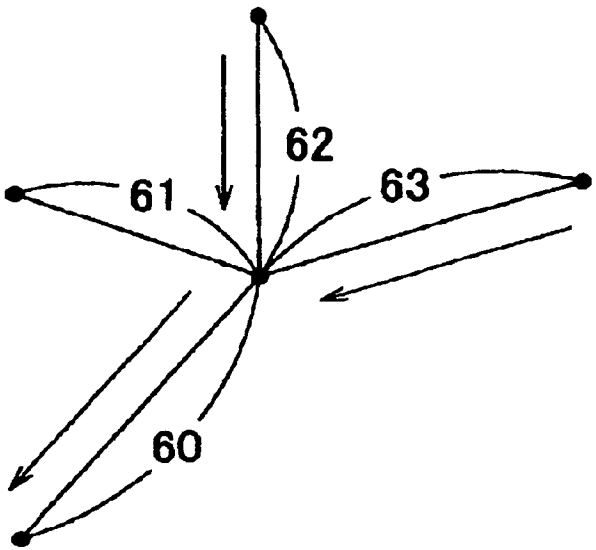
FIGS. 13A–B are exemplary schematic views of another method of synthesizing, and show states of displays before and after synthesizing.
Figure 13B:
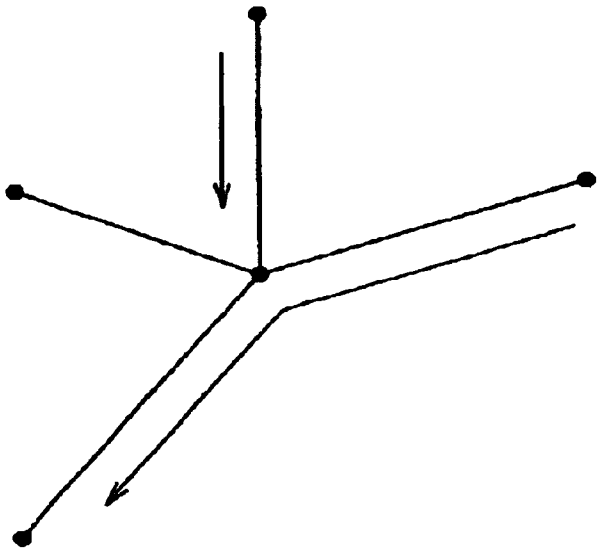

Although the aforementioned method of synthesis in accordance with the second embodiment is realized in consideration of the various factors, it can also be realized in consideration of other factors. For example, FIG. 13A shows a general state of display of traffic information with link numbers 60, 62, and 63 being designated as "traffic jam". In such a case, as shown in FIG. 13B, pieces of traffic jam information on the link numbers 60, 63 may be synthesized in consideration of the fact that another road (which corresponds to the link number 61) exists between a road corresponding to the link number 60 and a road corresponding to the link number 62.

Furthermore, traffic information on an intersection where three or more roads intersect with one another may be supplied in consideration of angles formed by the intersecting roads. For example, in the example shown in FIG. 13, pieces of traffic jam information on the link numbers 60, 63 may be synthesized in consideration of the fact that the road corresponding to the link number 63 intersects with the road corresponding to the link number 60 at a larger angle than the road corresponding to the link number 62 does (i.e., in consideration of the fact that the road corresponding to the link number 63 "almost continuously" leads to the road corresponding to the link number 60).

In the aforementioned method of synthesizing in accordance with the fourth embodiment, the signal for specifying a map range is received together with the request signal for designating a region. However, on the basis of a signal for specifying a map range which is transmitted together with a normal request signal (that does not designate any region), the traffic information distribution device 11 may extract traffic information on a region displayed on the map range, traffic information on a region covering the region displayed on the map range, or traffic information on a region related to a recommended route within the map range on the basis of a signal for specifying the map range.

Although the traffic information distribution device 11 of the traffic information distribution system 70 is supplied with pieces of traffic information collected by the traffic information center 10 in the aforementioned embodiments, it is also appropriate that synthesized pieces of traffic information be created on the basis of pieces of traffic information collected by the traffic information distribution device 11 itself. Although the navigation device 14a has been described in detail as a typical example of the traffic information output device 14 in the aforementioned embodiments, the traffic information output device 14 may be realized as any device as long as it is capable of outputting traffic information. That is, the traffic information output device may also be designed as a cellular phone or a terminal such as a portable information terminal (PDA). Self-evidently, the data communication means 52 may be built into the traffic information output device 14. If the traffic information output device 14 is a cellular phone in the aforementioned embodiments, the cellular phone itself functions as both the traffic information output device 14 and the data communication means 52. It is not absolutely required that the traffic information output device 14 have a function of displaying map information. If the traffic information output device 14 does not have this function, the traffic information distribution device 11 may transmit a map containing simplified figures to the reception side in addition to traffic information.

In the aforementioned embodiments, the traffic information output device 14 acquires traffic information from the traffic information distribution device 11 through radio communication based on radio waves. However, it is also appropriate that the traffic information output device 14, which may be designed as a desktop computer, acquire traffic information supplied from the traffic information distribution device 11 through a telephone line, an optical cable, or the like.

In the aforementioned embodiments, traffic information is displayed as images. However, traffic information may be output acoustically or literally. In such a case, the traffic information distribution device 11 equally suitably synthesizes pieces of traffic information supplied from the traffic information center 10, converts them into acoustic or literal data, and transmits the data. In this case, the traffic information output device 14 is required only to have a function of reproducing sounds or a function of displaying letters. In the aforementioned embodiments, the transmission side, namely, the traffic information distribution device 11 effectively synthesizes pieces of traffic information. However, it is also appropriate that the reception side, namely, the navigation device 14a synthesize pieces of traffic information by means of the methods of synthesizing in accordance with the embodiments. In such a case, a program for executing the methods of synthesizing in accordance with the embodiments is recorded on the record medium 32 shown in FIG. 3. This program is loaded into a RAM built into the ECU 30, and is executed by the ECU 30. In this case, it is also appropriate that the navigation device 14a directly receive pieces of traffic information to be synthesized from the traffic information center 10 through the FM antenna (see FIG. 3) of the an FM receiver 46.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A traffic *jam* information output device, comprising:

a receiver that receives synthesized pieces of traffic *jam* information;

an output device that outputs the received pieces of traffic *jam* information;

a display screen; and a transmitter that transmits a request signal for requesting a certain piece of the *pieces of* traffic [information] *jam information, the pieces being pieces of traffic jam information on two or more merging roads indicating respective directions on the display screen,* to a distribution device that distributes synthesized pieces of the traffic *jam* information to reduce an amount of synthesized pieces of traffic *jam* information displayed on the display screen, wherein:

the output device includes the display screen that displays a map, the transmitter transmits a signal indicating a scale of a map displayed on the display screen, as well as the request signal to the distribution device, and the receiver receives *the* pieces of the traffic *jam* information*, the pieces having* [that have] been synthesized in accordance with the scale of the displayed [map.] *map so that the pieces are replaced by a single piece of traffic jam information to display integrally the pieces of traffic jam information as a single traffic jam symbol indicating a substantially same direction as the respective directions*.

2. The traffic *jam* information output device according to claim 1, wherein:

the pieces of traffic *jam* information are synthesized based on at least one of road type, road attribute, angle formed by intersecting roads, road width, and a number of roads.

3. The traffic *jam* information output device according to claim 1, wherein:

the output device prohibits those pieces of the traffic *jam* information from being outputted that have an amount equal to or less than a predetermined amount.

[4. The traffic information output device according to claim 1, wherein:

the output device includes the display screen and displays a map, and the receiver receives pieces of the traffic information that have been synthesized based on a scale of the map displayed on the display screen.]

[5. The traffic information output device according to claim 1, wherein:

the output device includes the display screen that displays a map, and the receiver receives pieces of the traffic information that have been synthesized based on a display range of a map displayed on the display screen.]

6. The traffic *jam* information output device according to claim 1, wherein:

[the output device includes the display screen that displays a map,]

the transmitter transmits a signal indicating a display range of the map displayed on the display screen, as well as the request signal to the distribution device, and the receiver receives *the* pieces of the traffic *jam* information*, the pieces having* [that have] been synthesized in accordance with the range of the displayed map.

7. A traffic *jam* information distribution device, comprising:

a controller that synthesizes pieces of traffic [information;] *jam information on two or more merging roads indicating respective directions on a display screen so that the pieces are replaced by a single piece of traffic jam information to display integrally the pieces of traffic jam information as a single traffic jam symbol indicating a substantially same direction as the respective directions;* a transmitter that outputs the pieces of the traffic *jam* information that have been synthesized by the controller; and a receiver that receives a request signal for requesting a certain piece of the *pieces of* traffic *jam* information from an output device that outputs the pieces of the traffic *jam* information *and that includes the display screen*, wherein:

the receiver receives a signal indicating a scale of a map displayed on [a display] *the display* screen of the output device when receiving the request [signal;] *signal,* and the controller synthesizes the pieces of the traffic *jam* information based on the request signal for requesting a certain piece of the *pieces of* traffic *jam* information that has been received from the output device to reduce an amount of synthesized pieces of traffic *jam* information displayed on the display screen.

8. The traffic *jam* information distribution device according to claim 7, wherein the receiver receives a signal indicating a range of a map displayed on the display screen of the output device when receiving the request signal.

9. A method of outputting pieces of traffic *jam* information, comprising:

receiving synthesized pieces of traffic [information;] *jam information, the pieces being pieces of traffic jam information on two or more merging roads indicating respective directions on a display screen; and*

[outputting the received pieces of the traffic information; and]

transmitting a request signal for requesting a certain piece of the *pieces of* traffic *jam* information to a distribution device that distributes synthesized pieces of the traffic *jam* information *so that the pieces are replaced by a single piece of traffic jam information* to reduce an amount of synthesized pieces of traffic *jam* information displayed on [a display] *the display* screen, wherein a signal indicating a scale of a map displayed on the display screen for outputting received pieces of the traffic *jam* information is transmitted together with the request signal to the distribution [device.] *device; and*

*outputting integrally the received pieces of the traffic jam information as a single traffic jam symbol indicating a substantially same direction as the respective directions.*

10. The method according to claim 9, wherein:

outputting the pieces of the traffic *jam* information further comprises prohibiting those pieces of the traffic *jam* information from being output that have an amount that is equal to or less than a predetermined amount.

11. The method according to claim 9, further comprising:

transmitting a signal indicating a scale of a map displayed on the display screen for outputting the received pieces of the traffic *jam* information, wherein:

receiving the pieces of the traffic *jam* information further comprises receiving the pieces of traffic [information that have] *jam information, the pieces having* been synthesized in accordance with the scale of the displayed map.

12. The method according to claim 9, further comprising:

transmitting a signal indicating a range of a map displayed on the display screen for outputting the received pieces of the traffic *jam* information, wherein:

receiving the pieces of the traffic *jam* information further comprises receiving pieces of the traffic *jam* information that have been synthesized in accordance with the range of the displayed map.

13. The method according to claim 9, wherein:

a signal indicating a range of a map displayed on the display screen for outputting received pieces of the traffic *jam* information is transmitted together with the request signal to the distribution device.

14. A method of distributing pieces of traffic *jam* information, comprising:

requesting [a certain piece] *pieces* of the traffic *jam* information to a distribution device that distributes traffic [information;] *jam information, the pieces being pieces of traffic jam information on two or more merging roads indicating respective directions on a display screen;* synthesizing [the piece] *the pieces* of the traffic *jam* information *so that the pieces are replaced by a single piece of traffic jam information* using a controller; and outputting *integrally* the [piece] *pieces* of the traffic *jam* information that [has been] *have been* synthesized by the controller *as a single traffic jam symbol indicating a substantially same direction as the respective directions* to reduce an amount of synthesized pieces of traffic *jam* information displayed on [a display] *the display* screen; and receiving a signal indicating a scale of a map displayed on the display screen of an output device that outputs pieces of the traffic *jam* information, wherein:

synthesizing [the piece] *the pieces* of the traffic *jam* information further comprises synthesizing [the piece] *the pieces* of the traffic *jam* information in accordance with a scale of the map that is indicated by the received signal.

15. The method according to claim 14, further comprising:

receiving a signal indicating a range of a map displayed on the display screen of an output device that outputs pieces of the traffic *jam* information, wherein:

synthesizing [the piece] *the pieces* of the traffic *jam* information further comprises synthesizing [the piece] *the pieces* of the traffic *jam* information in accordance with the range of the displayed map that is indicated by the received signal.

16. The method according to claim 14, wherein

[the piece] *the pieces* of the traffic *jam* information [is synthesized] *are synthesized* based on at least one of a plurality of road type, road attribute, angle formed by intersecting roads, road width, and a number of roads.

17. The method according to claim 14, further comprising:

determining an amount of the pieces of the traffic *jam* information, wherein:

the pieces of the traffic *jam* information that have an amount that is equal to or less than a predetermined amount are prohibited from being distributed.

18. A traffic *jam* information output device having a display screen on which a map is displayed, comprising:

a transmitter that transmits a signal for requesting transmission of a certain piece of traffic *jam* information to reduce an amount of synthesized pieces of traffic *jam* information displayed on the display screen, and a signal indicating a scale of the map displayed on the display screen to a distribution device that synthesizes pieces of the traffic *jam* information *on two or more merging roads indicating respective directions on the display screen,* in accordance with a scale of the map on the display screen of the output device, *so that the pieces are replaced by a single piece of traffic jam information* and distributes the synthesized pieces of the traffic *jam* information;

a receiver that receives the certain pieces of the traffic *jam* information that have been distributed from the distribution device; and an output device that outputs *integrally* the received pieces of the traffic *jam* information to the display [screen.] *screen as a single traffic jam symbol indicating a substantially same direction as the respective directions.*

19. A traffic *jam* information output device having a display screen on which a map is displayed, comprising:

a transmitter that transmits a signal for requesting transmission of a certain piece of traffic *jam* information to reduce an amount of synthesized pieces of traffic *jam* information displayed on the display screen, and a signal indicating a range of the map displayed on the display screen to a distribution device that synthesizes pieces of the traffic *jam* information *on two or more merging roads indicating respective directions on the display screen so that the pieces are replaced by a single piece of traffic jam information,* in accordance with a range of the map displayed on the display screen of the output device, and distributes the synthesized pieces of the traffic *jam* information;

a receiver that receives the pieces of the traffic *jam* information that have been distributed from the distribution device;

and an output device that outputs *integrally* the received pieces of the traffic *jam* information to the [screen.] *display screen as a single traffic jam symbol indicating a substantially same direction as the respective directions.*

*20. A traffic jam information output device having a display screen comprising:*

*a transmitter that transmits a signal requesting pieces of traffic jam information;*

*a receiver that receives the requested pieces of traffic jam information; and*

*a navigation device that receives the requested pieces of traffic jam information from the receiver, the pieces being pieces of traffic jam information on two or more merging roads indicating respective directions on the display screen and synthesizes the requested pieces of traffic jam information in accordance with at least one parameter, so that the pieces are replaced by a single piece of traffic jam information,*

*wherein the display screen displays integrally the synthesized requested pieces of traffic jam information as a single traffic jam symbol indicating a substantially same direction as the respective directions.*

*21. A traffic jam information output device having a display screen according to claim 20, wherein*

*the display screen has a map; and*

*the at least one parameter includes the scale of the map.*

*22. A traffic jam information output device having a display screen according to claim 20, wherein the at least one parameter includes at least one of road type, road attribute, angle formed by intersecting roads, road width, and a number of roads.*

*23. A traffic jam information output device having a display screen according to claim 20, wherein the at least one parameter is based on actual road conditions.*

*24. A traffic jam information output device having a display screen according to claim 20, wherein*

*the display screen has a map; and*

*the at least one parameter includes the state of display of the map.*

*25. A traffic jam information output device having a display screen according to claim 20, wherein*

*the display screen has a map; and*

*the at least one parameter includes the range of display of the map.*

*26. A traffic jam information output device having a display screen according to claim 20, wherein the at least one parameter includes one or more of traffic jam information, regulation information, parking space information and service area information.*

*27. A traffic jam information output device having a display screen according to claim 20, wherein the at least one parameter includes one or more of situations at intersections, statistical values obtained from traffic volumes that have actually been measured and the number of roads.*

*28. A traffic jam information output device having a display screen according to claim 20, wherein*

*the display screen has a map; and*

*the at least one parameter includes the visibility of symbols on the map.*

*29. A traffic jam information output device having a display screen according to claim 20, wherein the synthesis reduces the amount of synthesized pieces of information displayed on the display screen.*

*30. A traffic jam information output device comprising:*

*a transmitter that transmits a signal requesting pieces of traffic jam information, the pieces being pieces of traffic jam information on two or more merging roads indicating respective directions on a display screen, the signal advising that the pieces of traffic jam information are to be synthesized in accordance with at least one parameter so that the pieces are replaced by a single piece of traffic jam information;*

*a receiver that receives the pieces of traffic jam information that have been synthesized in accordance with the at least one parameter; and*

*the display screen that displays integrally the received, synthesized pieces of traffic jam information as a single traffic jam symbol indicating a substantially same direction as the respective directions.*

*31. A traffic jam information output device according to claim 30, wherein*

*the display screen has a map; and*

*the at least one parameter represents the scale of the map.*

*32. A method of outputting pieces of traffic jam information comprising:*

*transmitting a signal requesting pieces of traffic jam information, the signal being transmitted from a traffic*

*jam information output device having a display screen, the pieces of traffic jam information being pieces of traffic jam information on two or more merging roads indicating respective directions on the display screen;*

*receiving the pieces of traffic jam information in the traffic jam information output device having the display screen;*

*synthesizing the pieces of traffic jam information in accordance with at least one parameter so that the pieces are replaced by a single piece of traffic jam information; and*

*displaying integrally the synthesized pieces of traffic jam information on the display screen as a single traffic jam symbol indicating a substantially same direction as the respective directions.*

*33. A method of outputting pieces of traffic jam information according to claim 32, wherein*

*the display screen has a map, and*

*the at least one parameter represents the scale of the map.*

*34. The traffic jam information output device according to claim 2, wherein the synthesizing occurs when the road types of the two or more roads are equal to each other and the road attributes of the two or more roads are equal to each other.*

*35. The method according to claim 16, wherein the synthesizing occurs when the road types of the two or more roads are equal to each other and the road attributes of the two or more roads are equal to each other.*

*36. The traffic jam information output device having a display screen according to claim 22, wherein the synthesizing occurs when the road types of two or more roads are equal to each other and the road attributes of the two or more roads are equal to each other.*

*37. The traffic jam information output device according to claim 1, wherein the synthesizing occurs when the scale of the map on the display screen is reduced.*

*38. The traffic jam information distribution device according to claim 7, wherein the synthesizing occurs when the scale of the map on the display screen is reduced.*

*39. The method of outputting pieces of traffic jam information according to claim 9, wherein the synthesizing occurs when the scale of the map on the display screen is reduced.*

*40. The method of distributing pieces of traffic jam information according to claim 14, wherein the synthesizing occurs when the scale of the map on the display screen is reduced.*

*41. The traffic jam information output device having a display screen on which a map is displayed according to claim 18, wherein the synthesizing occurs when the scale of the map on the display screen is reduced.*

*42. The traffic jam information output device having a display screen on which a map is displayed according to claim 19, wherein the synthesizing occurs when a scale of the map on the display screen is reduced.*

*43. The traffic jam information output device having a display screen according to claim 20, wherein the synthesizing occurs when a scale of a map on the display screen is reduced.*

*44. The traffic jam information output device according to claim 30, wherein the synthesizing occurs when a scale of a map on the display screen is reduced.*

*45. The method of outputting pieces of traffic jam information according to claim 32, wherein the synthesizing occurs when a scale of a map on the display screen is reduced.*

* * * * *